(12) United States Patent
Atkinson et al.

(10) Patent No.: US 7,650,799 B2
(45) Date of Patent: *Jan. 26, 2010

(54) METHOD AND APPARATUS FOR INVESTIGATING A GAS-LIQUID MIXTURE

(75) Inventors: Ian Atkinson, Ely (GB); John Sherwood, Cambridge (GB); Cheng-gang Xie, Sawston (GB)

(73) Assignee: Schlumberger Technology Corporation, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/048,831

(22) Filed: Mar. 14, 2008

(65) Prior Publication Data

US 2008/0223146 A1 Sep. 18, 2008

(30) Foreign Application Priority Data

Mar. 15, 2007 (GB) .................................. 0704948.9

(51) Int. Cl.
*G01F 1/37* (2006.01)
(52) U.S. Cl. .................................... 73/861.52
(58) Field of Classification Search ............. 73/861.04, 73/861.22, 861.66
See application file for complete search history.

(56) References Cited

U.S. PATENT DOCUMENTS

| 4,232,549 | A |   | 11/1980 | Migrin et al. |
| 4,282,751 | A |   | 8/1981  | Brown et al. |
| 4,312,234 | A |   | 1/1982  | Rhodes et al. |
| 4,467,659 | A |   | 8/1984  | Baumoel |
| 5,007,293 | A |   | 4/1991  | Jung |
| 5,203,211 | A |   | 4/1993  | Jung |
| 5,251,490 | A |   | 10/1993 | Kronberg |
| 5,287,752 | A |   | 2/1994  | Den Boer |
| 5,396,807 | A |   | 3/1995  | Dowty et al. |
| 5,400,657 | A |   | 3/1995  | Kolpak et al. |
| 5,463,906 | A |   | 11/1995 | Spani et al. |
| 5,501,099 | A | * | 3/1996  | Whorff .................... 73/29.01 |
| 5,591,922 | A | * | 1/1997  | Segeral et al. ............ 73/861.04 |
| 5,654,502 | A |   | 8/1997  | Dutton |

(Continued)

FOREIGN PATENT DOCUMENTS

EP 0076882 A1 4/1983

(Continued)

OTHER PUBLICATIONS

Atkinson et al: "New generation multiphase flowmeters from Schlumberger and Framo Engineering AS", 17th International North Sea Flow Measurement Workshop, Oslo, Norway, Oct. 25-28, 1999.

(Continued)

*Primary Examiner*—Jewel Thompson
(74) *Attorney, Agent, or Firm*—James McAleenan; Helene Raybaud; Jody Lynn DeStefanis

(57) ABSTRACT

A method and system are provided for investigating a gas-liquid fluid mixture as it is conveyed in a conduit having a first constriction region providing a reduced conduit cross section. The method and system include inducing the mixture to exhibit swirling flow in the first constriction region, thereby separating the liquid from the gas, and determining one or more properties of the fluid in the first constriction region.

28 Claims, 3 Drawing Sheets

U.S. PATENT DOCUMENTS

| | | | |
|---|---|---|---|
| 5,693,891 | A | 12/1997 | Brown et al. |
| 5,719,329 | A | 2/1998 | Jepson et al. |
| 5,793,216 | A | 8/1998 | Constant |
| 5,905,208 | A | 5/1999 | Ortiz et al. |
| 6,058,787 | A | 5/2000 | Hughes |
| 6,575,043 | B1 | 6/2003 | Huang et al. |
| 6,622,574 | B2 | 9/2003 | Fincke |
| 6,719,048 | B1 | 4/2004 | Ramos et al. |
| 6,758,100 | B2 | 7/2004 | Huang |
| 6,831,470 | B2 | 12/2004 | Xie et al. |
| 7,327,146 | B2 | 2/2008 | Simon |
| 7,454,981 | B2 | 11/2008 | Gysling |
| 2007/0157737 | A1 | 7/2007 | Gysling et al. |
| 2008/0163700 | A1 | 7/2008 | Huang |
| 2008/0223146 | A1 | 9/2008 | Atkinson et al. |
| 2008/0319685 | A1* | 12/2008 | Xie et al. |
| 2009/0114038 | A1 | 5/2009 | Atkinson et al. |

FOREIGN PATENT DOCUMENTS

| | | |
|---|---|---|
| GB | 2152213 A | 7/1985 |
| GB | 2177803 A | 1/1987 |
| GB | 2238615 A | 6/1991 |
| GB | 2279146 A | 12/1994 |
| GB | 2300265 A1 | 10/1996 |
| GB | 2343249 A | 5/2000 |
| GB | 2343249 B | 1/2001 |
| GB | 2363455 A | 12/2001 |
| GB | 2359435 B | 5/2002 |
| GB | 2363455 B | 10/2002 |
| GB | 2376074 A | 12/2002 |
| GB | 2406386 A | 3/2005 |
| GB | 2420299 A | 5/2006 |
| GB | 2447490 A | 9/2008 |
| GB | 2454256 A | 5/2009 |
| WO | 8902066 A1 | 3/1989 |
| WO | 9108444 A1 | 6/1991 |
| WO | 95/33980 A1 | 12/1995 |
| WO | 9724585 A1 | 7/1997 |
| WO | 00/03207 A1 | 1/2000 |
| WO | 0123845 A1 | 4/2001 |
| WO | 2004106861 A2 | 12/2004 |
| WO | 2004106861 A3 | 2/2005 |
| WO | 2005031311 A1 | 4/2005 |
| WO | 2005040732 A1 | 5/2005 |
| WO | 2007105961 A1 | 9/2007 |
| WO | 2007129897 A1 | 11/2007 |
| WO | 2008029025 A1 | 3/2008 |
| WO | 2008084182 A1 | 7/2008 |
| WO | 2008110805 A1 | 9/2008 |
| WO | 2009037434 A1 | 3/2009 |
| WO | 2009037435 A2 | 3/2009 |
| WO | 2009056841 A1 | 5/2009 |

OTHER PUBLICATIONS

Batchelor: "Steady axisymmetric flow with swirl", An Introduction to Fluid Dynamics, Cambridge University Press, 2000, section 7.5, pp. 543-555.

Clark: "Liquid film thickness measurement", Multiphase Science and Technology, vol. 14, No. 1, 2002, pp. 1-74.

Constant et al: "Multiphase metering using ultrasonics as an alternative approach", Documentation of Multiphase Metering Conference, Mar. 12-13, 1997, The Airport Skean Hotel, Aberdeen, Organised by IBC Technical Services Ltd.

Falcone et al: "ANUMET—a novel wet gas flowmeter", SPE Annual Technical Conference and Exhibition, Denver, Colorado, Oct. 5-8, 2003, SPE 84504.

Folgerø et al: "Permittivity measurement of thin liquid layers using open-ended coaxial probes", Measurement Science and Technology, vol. 7, 1996, pp. 1164-1173.

Gibson et al: "Keynote paper—Swirling flow through Venturi tubes of convergent angle 10.5° and 21°", Proceedings of FEDSM2006, 2006 ASME Joint U.S.—European Fluids Engineering Summer Meeting, Miami, Florida, Jul. 17-20, 2006, FEDSM2006-98229.

Greenwood et al: "Self-calibrating sensor for measuring density through stainless steel pipeline wall", Journal of Fluids Engineering, vol. 126, 2004, pp. 189-192.

Gudmundsson et al: "Gas-liquid metering using pressure-pulse technology", SPE Annual Technical Conference and Exhibition, Houston, Texas, Oct. 3-6, 1999, SPE 56584.

Gunarathne et al: "Novel techniques for monitoring and enhancing dissolution of mineral deposits in petroleum pipelines", Offshore Europe Conference, Aberdeen, Sep. 5-8, 1995, SPE 30418.

Hammer: "Flow permittivity models and their application in multiphase meters", Proceedings of Multiphase Metering, IBC Technical Services, Aberdeen Mar. 12-13, 1997.

Hayman et al: "High-resolution cementation and corrosion imaging by ultrasound", SPWLA 32nd Annual Logging Symposium, Midland, TX, USA, Jun. 16-19, 1991, paper KK.

Lynnworth: "Level of liquids and solids", Ultrasonic measurements for process control. Theory, techniques, applications, Academic Press, 1989, chapter 2, section 2.4.3, pp. 58-63.

Lynnworth: "Ultrasonic measurements for process control. Theory, techniques, applications", Academic Press, 1989, pp. 23-27, 30, 32-35, 254-255, 312-317.

Takeda: "Velocity profile measurement by ultrasound Doppler shift method", Int. J. Heat & Fluid Flow, vol. 7, No. 4, 1986, pp. 313-318.

Theron et al: "Stratified flow model and interpretation in horizontal wells", SPE Annual Technical Conference and Exhibition, Denver, Colorado, Oct. 6-9, 1996, SPE 36560.

Willemetz et al: "Instantaneous Doppler frequency measurement and implementation in a multigate flowmeter", EUROSON 87, Helsinki, Finland, Jun. 14-18, 1987.

Xie: "Measurement of multiphase flow water fraction and water-cut", American Institute of Physics Conference Proceedings, Jun. 5, 2007, vol. 914, pp. 232-239. Proc. 5th Int. Symp. on Measurement Techniques for Multiphase Flows (5th ISMTMF), Dec. 11-14, 2006, Macau, China.

Bondet De La Bernardie et al. "Low (10-800 MHz) and high (40 GHz) frequency probes applied to petroleum multiphase flow characterization", Measurement Science and Technology, vol. 19, 2008, pp. 1-8.

Fryer et al., "The effect of swirl on the liquid distribution in annular two-phase flow" International Journal of Multiphase Flow, vol. 8, 1982, pp. 285-289.

* cited by examiner

METHOD AND APPARATUS FOR INVESTIGATING A GAS-LIQUID MIXTURE

CROSS-REFERENCE TO RELATED APPLICATIONS

The present application claims priority under 35 U.S.C. §119 to Great Britain Application No. 0704948.9, filed on Mar. 15, 2007, naming Atkinson et al. as inventors, which is incorporated herein by reference in its entirety for all purposes.

FIELD OF THE INVENTION

The present invention relates to the investigation of the properties of a gas-liquid fluid mixture, in particular a two- or three-phase gas-liquid fluid mixture.

BACKGROUND OF THE INVENTION

The determination of gas and liquid flow rates in gas-liquid fluid mixtures is important in the oil and gas industry.

An example of an apparatus for measuring such flow rates is Schlumberger's Vx™ system (see e.g. I. Atkinson, M. Berard, B.-V. Hanssen, G. Ségéral, $17^{th}$ International North Sea Flow Measurement Workshop, Oslo, Norway 25-28 Oct. 1999 "New Generation Multiphase Flowmeters from Schlumberger and Framo Engineering AS") which comprises a vertically mounted Venturi flow meter, a dual energy gamma-ray hold up measuring device and associated processors. This system allows the simultaneous calculation of gas, water and oil volumetric flow rates in multi phase flows.

However, with conventional implementations of Vx™ technology the accuracy of the calculations starts to degrade as the gas volume fraction (GVF) increases above about 90%. In particular, at high GVF it can be difficult to determine properties of the liquid phase.

WO2005/031311 discloses a flow conditioner for providing an isokinetic main fluid stream to be sampled by a sampling probe. The flow conditioner is a pipe section which includes a swirl inducing section, a flow straightener and an orifice plate. The swirl inducing section distributes a liquid film on the wall of the pipe section which is shed back into the gas core by the orifice plate, whereby turbulence causes good mixing of the liquid and gas phases. Straightening the flow of the gas core prior to the orifice plate reduces the amount of liquid that is redeposited onto the pipe wall after shedding by the orifice plate upstream of the sampling point.

WO 2004/106861 proposes a multi phase flowmeter in which a twisted tape device is used to separate a liquid phase from a liquid-gas mixture into an annular film on the tube wall of a straight pipe section. Measurements are made to determine the liquid flow rate in the film. Following the straight pipe section, the liquid is re-entrained into the gas stream by an expansion contraction system. The homogenised flow is then passed to a Venturi.

J. Gibson and M. Reader-Harris, *Swirling flow through Venturi tubes of convergent angle 10.5° and 21°*, Proc. FEDSM2006, Jul. 17-20 2006, Miami, Fla., discusses computations of swirling flows of dry gases in Venturi tubes.

SUMMARY OF THE INVENTION

In general, the present invention aims to provide a method and an apparatus for separating the gas and liquid phases of a gas-liquid mixture in order that one or more properties of the liquid can be more easily determined.

Accordingly, a first aspect of the present invention provides a method of investigating a gas-liquid fluid mixture as it is conveyed in a conduit having a first constriction region providing a reduced conduit cross section, the method comprising the steps of:

inducing the mixture to exhibit swirling flow in the first constriction region, thereby separating the liquid from the gas; and determining one or more properties of the fluid (and preferably one or more properties the liquid) in the first constriction region.

Typically, the constriction region is a Venturi, the throat of the Venturi providing the reduced conduit cross section.

Inducing the mixture to exhibit swirling flow separates the liquid and gas phases of the mixture, particularly in a conduit, such as a pipe or pipeline, of substantially uniform diameter. The swirling flow causes the liquid of the mixture to be displaced to the wall of the conduit, e.g. to form an annulus of liquid adjacent the wall of the conduit.

Swirling flow in the constriction region will have increased centrifugal acceleration relative to swirling flow outside the constriction region (e.g. at the entrance to the constriction region). This increased centrifugal acceleration can enhance the displacement of liquid to the wall of the conduit. Thus preferably, the swirling flow in the first constriction region is induced by provoking swirling flow in the conduit upstream of the first constriction region.

Within the constriction the separated liquid layer flows more slowly than the gas, which increases the liquid hold up, making it easier to investigate the properties of the liquid. For example, the density, sound velocity, electrical conductivity or permittivity of the separated liquid can be measured, revealing e.g. the oil/water ratio in the liquid. The thickness of the liquid layer and/or velocity of the liquid in the layer can also be measured, for example ultrasonically (using e.g. pulsed Doppler ultrasound). In particular, at the constriction region enhanced centrifugal separation can reduce the amount of entrained gas in the liquid, thereby rendering the liquid sound velocity more certain and improving the accuracy of ultrasonic measurements. For example, the liquid layer thickness and hence liquid hold up can be obtained from the relative depth of the gas liquid interface where the cross-pipe profile of the pulsed ultrasound Doppler energy is at a maximum.

The differential pressure of the fluid mixture between a position in the conduit upstream (or downstream) of the constriction region and a position in the constriction region itself may be measured.

The conduit may include a second constriction region providing a reduced conduit cross section in which the mixture does not exhibit swirling flow, and the method may include determining one or more properties of the mixture as it is conveyed through the second constriction region.

Typically, the second constriction region is a Venturi, the throat of the Venturi providing the reduced conduit cross section. However, the second constriction region may be e.g. an orifice plate, the aperture of the plate providing the reduced conduit cross section.

The differential pressure of the fluid mixture between a position in the conduit upstream (or downstream) of the second constriction region and a position in the second constriction region itself may be measured.

Preferably, the second constriction region is provided upstream of the first constriction region. With this arrangement, it may be unnecessary to provide, for example, a flow straightener upstream of the second constriction region.

The step of inducing the swirling flow may include providing a swirl element for inducing the mixture to exhibit swirling flow in the first constriction region. Preferably, the swirl element is provided upstream of the first constriction region, and more preferably it is provided adjacent the entrance to the first constriction region. The swirl element may be, for example, a helical insert or a vane assembly shaped and positioned to induce the mixture to exhibit swirling flow. Additionally or alternatively, the swirling flow may be induced by means of a tangential flow entry into the conduit, or by means of a bend or bends in the conduit, upstream of the first constriction region. Where a second constriction region is provided upstream of the first constriction region, the swirl element is preferably provided between the respective constriction regions.

The liquid may comprise oil and/or water. The gas may comprise natural gas. The gas-liquid fluid mixture may be a mixture of natural gas, condensate and optionally water.

The gas volume fraction (GVF) of the mixture may be at least 75%, and the invention has particular utility when the GVF is at least 85% or 95%.

A second aspect of the present invention provides an apparatus for investigating the properties of a gas-liquid fluid mixture, the apparatus comprising:

a conduit along which the mixture is conveyable, the conduit having a first constriction region providing a reduced conduit cross section; and a measurement assembly for determining one or more properties of the fluid (and preferably one or more properties of the liquid) as it flows through the first constriction region;

wherein the conduit is adapted to induce the mixture to exhibit swirling flow in the first constriction region, thereby separating the liquid from the gas.

Thus the apparatus can be used to perform the method of the first aspect. Optional or preferred features of the first aspect may therefore be applied to the second aspect.

For example, the constriction region is typically a Venturi, the throat of the Venturi providing the reduced conduit cross section.

The measurement assembly may include one or more pressure meters for measuring the fluid pressure in the first constriction region and a region of the conduit upstream and/or downstream of the first constriction region. For example, a differential pressure meter may measure the differential fluid pressure between the first constriction region and a region of the conduit upstream and/or downstream of the first constriction region.

The apparatus may have a second constriction region providing a reduced conduit cross section, the conduit being adapted such that the mixture does not exhibit swirling flow in the second constriction region. Preferably, the second constriction region is provided upstream of the first constriction region. The second constriction region may be a Venturi, the throat of the Venturi providing the reduced conduit cross section.

The measurement assembly may include one or more pressure meters for measuring the fluid pressure in the second constriction region and a region of the conduit upstream and/or downstream of the second constriction region. For example, a differential pressure meter may measure the differential fluid pressure between the second constriction region and a region of the conduit upstream and/or downstream of the second constriction region.

The conduit may include a swirl element for inducing the mixture to exhibit swirling flow in the first constriction region. The swirl element may be provided upstream of the first constriction region and is preferably adjacent the entrance to the first constriction region. The swirl element may be a helical insert or a vane assembly shaped and positioned to induce the mixture to exhibit swirling flow. Where a second constriction region is provided upstream of the first constriction region, the swirl element is preferably provided between the respective constriction regions The measurement assembly may be adapted to output a signal indicative of the liquid velocity in the first constriction region. The measurement assembly may be adapted to output a signal indicative of the liquid hold up in the first constriction region. The measurement assembly may be adapted to take ultrasound (preferably Doppler ultrasound) measurements. Where a second constriction region is provided, the apparatus may include a further measurement assembly for measuring one or more properties of the fluid mixture as it flows through the second constriction region.

A third aspect of the present invention provides an apparatus according to the second aspect when conveying a gas-liquid fluid mixture.

The liquid may comprise oil and/or water. The gas may comprise natural gas. The gas-liquid fluid mixture may be a mixture of natural gas, condensate and optionally water.

The gas volume fraction (GVF) of the mixture may be at least 75%, and the invention has particular utility when the GVF is at least 85% or 95%.

A further aspect of the present invention provides an oil well pipeline or a gas well pipeline comprising an apparatus according to the second or third aspect of the invention.

A further aspect of the present invention provides the use of swirling flow in a conduit conveying a gas-liquid fluid mixture to separate the mixture in a constriction region of a conduit, the constriction region providing a reduced conduit cross section.

A further aspect of the present invention provides the use of swirling flow in a conduit conveying a gas-liquid fluid mixture to increase the liquid hold-up in a constriction region of the conduit, the constriction region providing a reduced conduit cross section.

In both these aspects, the constriction region may be a Venturi, the throat of the Venturi providing the reduced conduit cross section. Further, the gas-liquid fluid mixture may be a mixture of natural gas, condensate and optionally water.

BRIEF DESCRIPTION OF THE DRAWINGS

The invention will be described by way of example with reference to the accompanying drawings, in which.

DETAILED DESCRIPTION

The present invention relates to the provision of swirling flow in a constriction region of a conduit, thereby separating the liquid from the gas and facilitating the measurement of properties of the liquid in the constriction region.

Figure 1:
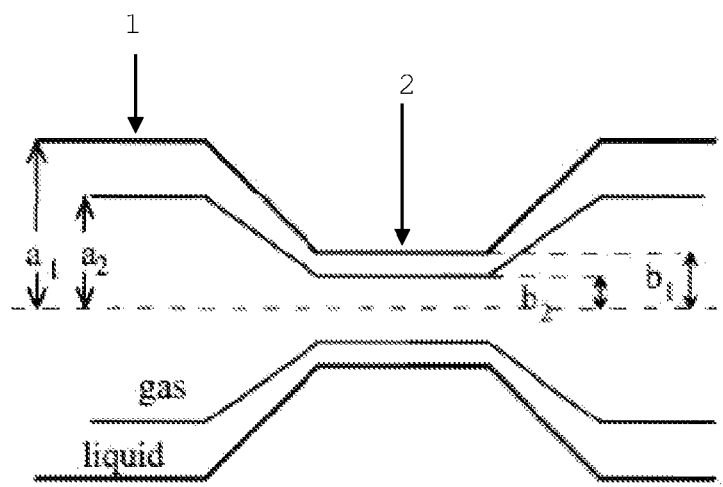
FIG. 1 shows schematically a conduit having a Venturi and carrying a swirling two-phase gas-liquid flow, FIG. 2 plots theoretically predicted gas hold up for swirling gas-liquid flow in a throat as a function of gas volume fraction GVF prior to flow separation, curves (a)-(k) being for progressively higher fluid rotation rates, FIG. 3 re-plots the results of FIG. 2 to show the liquid hold up in the throat as a function of liquid hold up at the inlet prior to separation.

FIG. 1 shows schematically a conduit 1 having a Venturi 2. The conduit carries a swirling two-phase gas-liquid flow. The swirl generates a centrifugal force which forces the liquid and gas to separate, the liquid forming a surface layer on the wall of the conduit.

The swirling flow may be induced, for example, by a helical insert or vane assembly within the conduit, or a tangential flow inlet to the conduit.

The conduit upstream and downstream of the Venturi has an inner radius $a_1$ and the Venturi itself has a throat inner radius $b_1$. The swirling liquid flow has an average angular velocity of $\omega_{entry}$ at the entrance to the Venturi, and an average angular velocity of $\omega_{throat}$ in the throat of the Venturi. Thus, by conservation of angular momentum (ignoring losses such as friction), $a_1^2 \omega_{entry} \approx b_1^2 \omega_{throat}$.

The centrifugal acceleration of the liquid in the throat is approximately $b_1 \omega_{throat}^2$. By substitution, this can be rewritten as $(a_1^4/b_1^3)\omega_{entry}^2$. Therefore, centrifugal acceleration of the fluid in the throat is increased with respect to the entrance to the Venturi by a factor of about $(a_1/b_1)^3$. Thus, particularly in the throat, centrifugal separation of the liquid and gas phases promotes the formation of a layer of separated liquid on the wall of the conduit by reducing both the liquid entrainment in the gas and the gas entrainment in the liquid.

At the entrance to Venturi, the separated gas occupies a central region of the conduit, the central region having a radius $a_2$, and liquid occupies an outer annulus of thickness $a_1-a_2$. In the throat, the central region of separated gas has a radius $b_2$, and the liquid occupies an outer annulus of thickness $b_1-b_2$.

The separated, swirling liquid flows axially more slowly than the gas, and the liquid hold up in the throat, $\alpha_{l,throat}$, is therefore larger than it would be if the gas and liquid traveled at the same axial velocity (as when the liquid is entrained in the gas).

Figure 2:
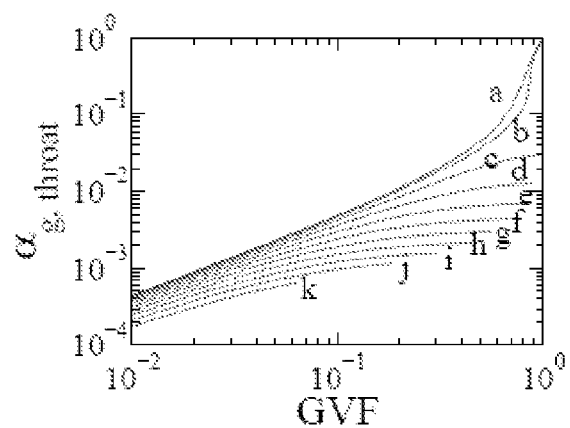

FIG. 2 shows the predictions of a model based on an inviscid incompressible flow theory (see e.g. G. K. Batchelor, An Introduction to Fluid Dynamics, section 7.5, Cambridge University Press (1973)). The model assumes that at the entrance to the Venturi, although the gas and liquid have separated, there is negligible slip between the gas and liquid so that the gas volume fraction $GVF=(a_2/a_1)^2=q_g/q_{tot}$. Each of curves (a) to (k) plots the gas hold up in the throat $\alpha_{g,throat}=(b_2/b_1)^2$ as a function of GVF for rotation rates $\Omega=U_0k/2$, where $q_g$ is the gas volumetric flow rate, $q_{tot}$ is the total volumetric flow rate, $U_0=q_{tot}/(2\pi a_1^2)$ is the axial velocity at the inlet, k is a swirl parameter, and (a) $ka_1=0$, (b) $ka_1=0.5$, (c) $ka_1=1.0$, (d) $ka_1=1.5$, (e) $ka_1=2.0$, (f) $ka_1=2.5$, (g) $ka_1=3.0$, (h) $ka_1=3.5$, (i) $ka_1=4.0$, (j) $ka_1=4.5$, and (k) $ka_1=5.0$. In this example, the Venturi throat has radius $b_1=0.5a_1$ (i.e. $b_1/a_1=\beta=0.5$), the liquid density $\rho_l=10^3$ kg m$^{-3}$ is that of water and the gas density $\rho_g=0.0018\rho_l$, is approximately that of air.

Curve (a) of FIG. 2 shows that once the liquid is separated from the gas, thereby reducing gas-liquid viscous interaction, the gas hold up in the throat, $\alpha_{g,throat}=1-\alpha_{l,throat}$ is much lower than the gas hold up prior to separation, $\alpha_{g,inlet}$, where the gas and liquid are assumed to flow at the same axial velocity and so $\alpha_{g,inlet}=GVF$.

However, in curve (a) the swirl is so small that its effect on the fluid flow can be neglected, apart from the fact that it has thrown liquid to the walls to separate it from the gas. In subsequent curves (b) to (k), the swirl increases leading to a reduction in the gas hold up in the throat. Essentially, this is because the tangential velocity of the liquid at the wall increases more than that of the gas at the centre. In the swirling fluid, acceleration is towards the axis of the conduit, so the pressure in the liquid has to be higher than that in the gas. It follows (by Bernoulli's equation) that the liquid at the wall has to flow more slowly in the axial direction than the gas. Therefore, to maintain the mass flow rate of liquid in the throat equal to that at the entrance, the liquid hold up must increase in the throat.

The curves do not extend all the way to 100% gas (i.e. $a_2=a_1$, and GVF=1) since the theory breaks down by that stage.

Figure 3:
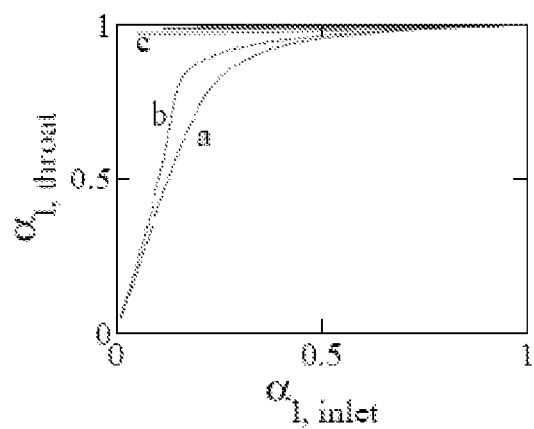

FIG. 3 re-plots the results of FIG. 2 to show the liquid hold up in the throat, $\alpha_{l,throat}$ as a function of liquid hold up at the inlet prior to separation, $\alpha_{l,inlet}$. Clearly, $\alpha_{l,throat}>\alpha_{l,inlet}$. Only curves corresponding to (a) $ka_1=0$, (b) $ka_1=0.5$ and (c) $ka_1=1.0$ are well distinguished. The curves for higher rotation rates predict $\alpha_{l,throat}$ close to unity for all the GVFs that can be modelled.

Having reduced the amount of entrained gas in the liquid annulus at the Venturi throat, one or more properties of the liquid can be then determined. For example, the thickness of the liquid annulus and hence liquid hold up at the throat can be determined, e.g. by pulsed ultrasonic Doppler and/or ultrasonic pulse-echo measurement of the position of the gas-liquid interface. U.S. Pat. No. 6,758,100 discusses the use of pulsed ultrasonic Doppler measurements to make flow measurements, comprising determination of interface distributions in a pipe.

The enhanced centrifugal separation produced at the Venturi throat by the swirling flow increases the thickness of the liquid annulus. It also reduces uncertainty in the velocity of sound in the liquid by reducing gas entrainment in the liquid. This improves the accuracy of pulsed ultrasonic Doppler and/or ultrasonic pulse-echo measurements of the position of the gas-liquid interface. For example, the interface will generally be positioned where the cross-pipe profile of the ultrasound Doppler energy is at a maximum, as a result of reflections from a wavy gas-liquid interface with high-contrast acoustic impedance. The liquid layer sound velocity may also be measured by ultrasound.

Figure 4:
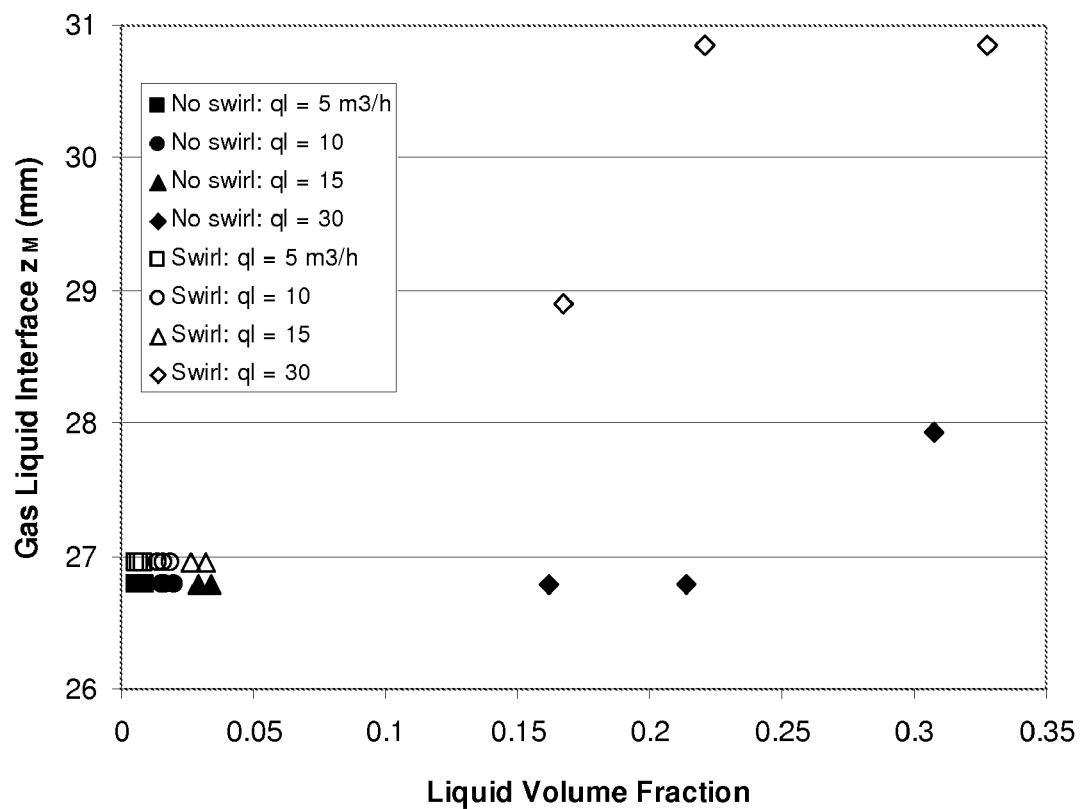
FIG. 4 shows pulsed Doppler ultrasound measurements of the position of a gas-liquid interface, $z_M$, for swirling flows and non-swirling flows of gas-liquid mixtures through a Venturi at different liquid volume fractions and flow rates.

That gas-liquid centrifugal separation does increase the liquid layer thickness at the Venturi throat can be seen from FIG. 4 which shows pulsed ultrasonic Doppler measurements of the position of the gas-liquid interface, $z_M$, for swirling flows and non-swirling flows of gas-liquid mixtures through a Venturi. In FIG. 4 $z_M$ is plotted as a function of liquid volume fraction (LVF) for different liquid flow rates.

The ultrasonic Doppler measurement can provide the liquid axial velocity as well as the liquid hold up at the throat. Thus the liquid flow rate, $q_l$, can be established.

For example, in the case where the liquid annulus at the Venturi throat is free of entrained gas, a combined measurement of the time-averaged Doppler axial velocity profile $u(z)$ and the Doppler energy profile $E(z)$ leads to the liquid flow rate from the following velocity profile integration:

$$q_l = 2\prod \int_{z=z_w}^{z=z_M} \langle u(z,t)\rangle (b_1-z)dz, z_M = z \mid_{E(z)=\max\langle E(z,t)\rangle}$$

where $z_w$ is the pipe inner wall starting position (from z=0), $z_M$ is the depth position where the Doppler energy cross-pipe profile $E(z)$ is at a maximum.

Then, assuming an appropriate Venturi differential pressure model for the swirling gas-liquid flow, the Venturi ΔP measurement ($\Delta P = P_{entry} - P_{throat}$) can be used to estimate the total volumetric flow rate, $q_{tot}$, and thence the gas flow rate $q_g = q_{tot} - q_l$ For example, a Venturi differential pressure model (International Standard ISO 5167-1, Measurement of fluid flow by means of pressure differential devices, 1991) provides the expression:

$$\Delta P_{NoSwirl} = \frac{1-\beta^4}{2C_d^2 A_T^2} \rho_m q_{tot}^2$$

where $C_d$ is a discharge coefficient, $A_T$ is the cross-sectional area of the Venturi throat, and $\rho_m$ is the average density of the total fluid flow. When there is swirl the expression can be modified such that:

$$\Delta P_{Swirl} = K \frac{1-\beta^4}{2C_d^2 A_T^2} \rho_m q_{tot}^2$$

where K is a factor due to swirl and is equal to 1 when there is no swirl and is greater than 1 when there is swirl. Where the liquid is a two phase water/oil mixture, then the liquid density $\rho_l$ may be obtained from the expression $$\rho_l = \rho_w WLR + \rho_o (1-WLR)$$

where $\rho_w$ is the water density, $\rho_o$ is the oil density, and WLR is the water-liquid ratio or water-cut.

Figure 5:
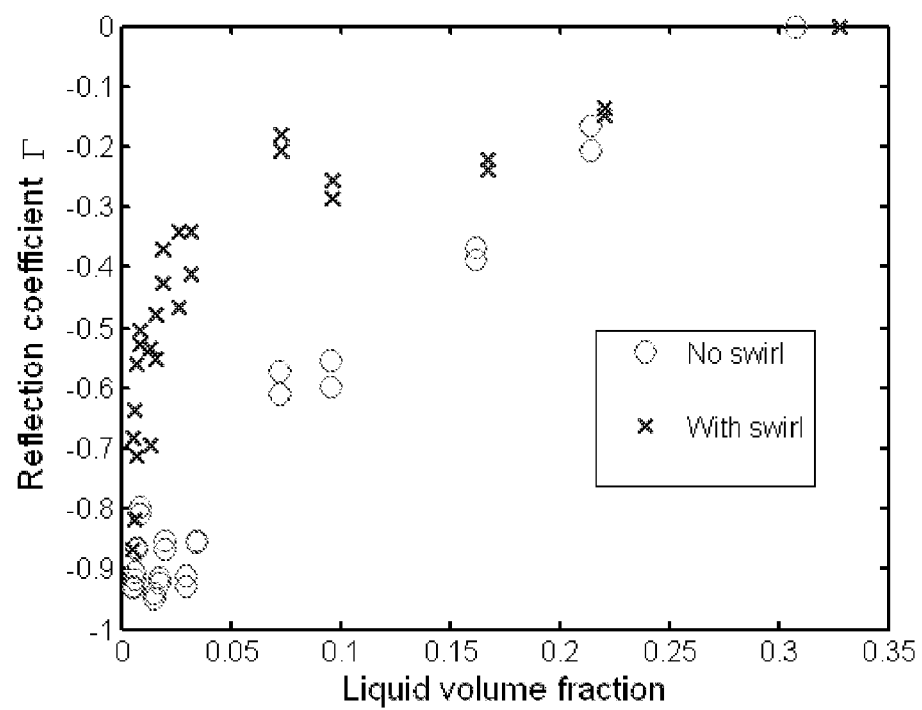
FIG. 5 shows calculated values for the acoustic reflection coefficient, $\Gamma$, for swirling and non-swirling flows at different liquid volume fractions.

An analysis of changes in the (reflected) Doppler energy magnitude can be performed to derive an estimate of the gas-entrainment in the liquid annulus. The integrated Doppler energy cross-pipe profile E(z) (normalized to a maximum corresponding to a near pure liquid flow) can be related to the mixture acoustic reflection coefficient, $\Gamma$, which is the level of acoustic impedance (Z) mismatch due to entrained gas with respect to that of a pure liquid annulus ($Z_l$) as follows:

$$\Gamma = \frac{Z_m - Z_l}{Z_m + Z_l} = \frac{\sum_{z=z_w}^{z=z_w+b_1} E(z)}{\sum_{z=z_w}^{z=z_w+b_1} E(z)\bigg|_{low-GVF\ liquid\ flow}} - 1$$

where $Z_m$ is the acoustic impedance of the liquid annulus containing entrained gas. FIG. 5 shows values for the acoustic reflection coefficient $\Gamma$, estimated using the above expression from the Doppler energy profile E(z), for swirling and non-swirling flows and different LVFs. Evidently, the swirling motion yields $\Gamma$ values closer to $\Gamma=0$ (a perfect acoustic impedance match with that of pure liquid), which is consistent with less entrained gas in the liquid.

The gas-liquid mixture acoustic impedance, $Z_m$, can be derived from $\Gamma$ as follows:

$$Z_m = \frac{1+\Gamma}{1-\Gamma} Z_l$$

The gas-liquid homogeneous mixture sound velocity, $c_m$, and density, $\rho_m$, may be related to the individual gas and liquid sound velocities ($c_g$, $c_l$) and densities ($\rho_g$, $\rho_l$) and the liquid fraction ($\alpha_l$) as follows:

$$\frac{1}{\rho_m c_m^2} = \frac{1-\alpha_1}{\rho_g c_g^2} + \frac{\alpha_1}{\rho_1 c_1^2}$$

Expressing this in terms of acoustic impedance $Z=\rho c$ leads to:

$$\frac{\rho_m}{Z_m^2} = \frac{\rho_g(1-\alpha_1)}{Z_g^2} + \frac{\rho_1 \alpha_1}{Z_1^2}$$

Noting that $\rho_m = \rho_g(1-\alpha_l) + \rho_l \alpha_l$, the annulus liquid hold up can be readily derived as:

$$\alpha_1 = \frac{\rho_g(Z_g^{-2} - Z_m^{-2})}{\rho_g(Z_g^{-2} - Z_m^{-2}) - \rho_1(Z_1^{-2} - Z_m^{-2})}$$

Figure 6:
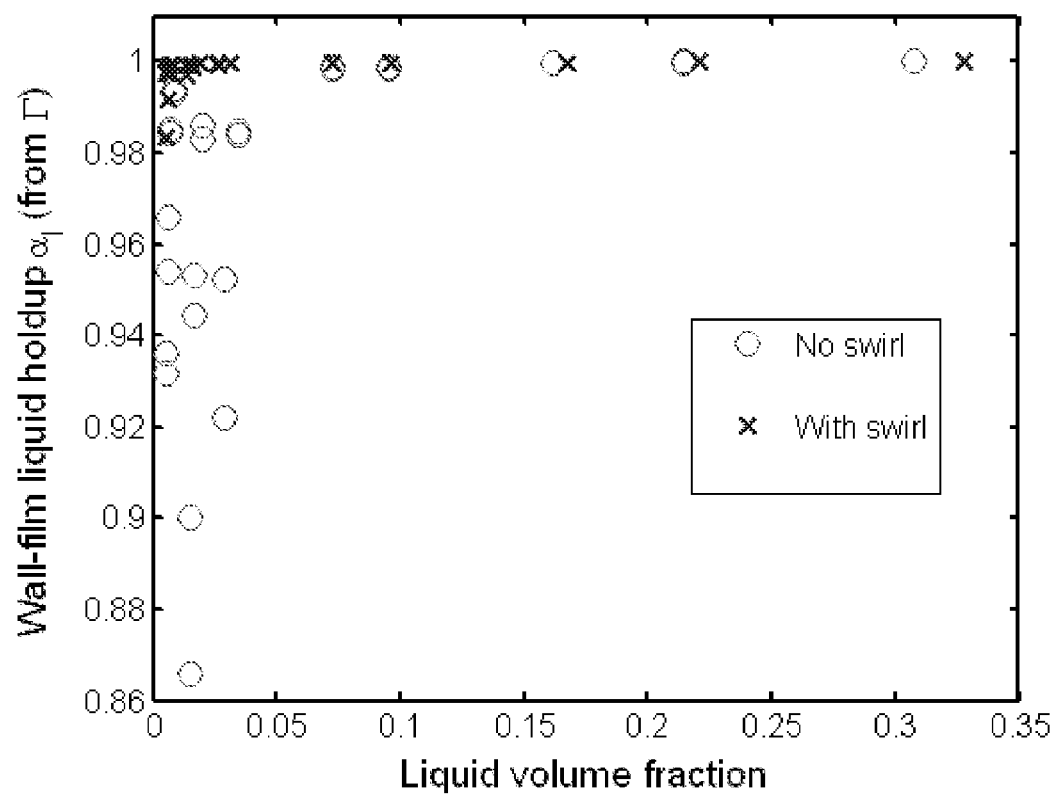
FIG. 6 shows corresponding liquid hold up values for the acoustic reflection coefficient values of FIG. 5.

Using this model for the gas-liquid mixture acoustic impedance, the $\Gamma$ values of FIG. 5 were converted into the corresponding $\alpha_l$, values of FIG. 6. The benefit of gas-liquid centrifugal separation is evident from FIG. 6, where the wall film liquid hold up is effectively 1 for LVF>~0.01. Further, the gas-liquid mixture acoustic impedance model gives an estimate of the gas fraction in the liquid annulus (i.e. $Z_m$ can be calculated from $\Gamma$, and $\alpha_l$ can then be calculated from $Z_m$).

Separation of the liquid and gas reduces the viscous coupling between the two fluids, so that slip is increased and the liquid holdup increases. However, differential pressure measurement at the Venturi provides a weighted average value of $\rho u^2$, (where $\rho$ is density and u is velocity). However, by changing the amount of slip, we can change the hold up and hence the mean density. For example, a second (preferably upstream) Venturi can be provided at which there is no swirl and less slip. The velocities of liquid and gas will be different at the second Venturi, but the mass flow rate of each fluid must remain unchanged. When the amount of slip at each Venturi is known (e.g. via appropriate slip laws) we have two measurements which enable the two mass flow rates (liquid and gas) to be determined.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The entire contents of the references cited above are hereby incorporated by reference.

The invention claimed is:

1. A method of investigating a gas-liquid fluid mixture as it is conveyed in a conduit having a first constriction region providing a reduced conduit cross section, the method comprising the steps of:

inducing the mixture to exhibit swirling flow in the first constriction region, thereby separating the liquid from the gas; and determining one or more properties of the liquid in the first constriction region.

2. A method according to claim 1, further comprising the step of:
determining the pressure difference between a position in the first constriction region and a position in a region of the conduit upstream and/or downstream of the first constriction region.

3. A method according to claim 1, wherein the conduit includes a second constriction region providing a reduced conduit cross section in which the mixture does not exhibit swirling flow, and the method includes determining one or more properties of the mixture as it is conveyed through the second constriction region.

4. A method according to claim 3, further comprising the step of:
determining the pressure difference between a position in the second constriction region and a position in a region of the conduit upstream and/or downstream of the second constriction region.

5. A method according to claim 1, wherein the step of inducing the swirling flow includes providing a swirl element for inducing the mixture to exhibit swirling flow in the first constriction region.

6. A method according to claim 5, wherein the swirl element is provided upstream of the first constriction region.

7. A method according to claim 1, wherein said determination step includes a step of measuring the liquid velocity in the first constriction region.

8. A method according to claim 7, wherein the velocity measurement step includes the use of an ultrasound Doppler measurement technique.

9. A method according to claim 1, wherein said determination step includes a step of measuring the liquid hold-up in the first constriction region.

10. A method according to claim 9, wherein the liquid hold-up measurement step includes the use of ultrasound to detect the gas-liquid interface.

11. A method according to claim 1, wherein said determination step includes a step of measuring the liquid sound velocity in the first constriction region.

12. A method according to claim 1, wherein when the mixture includes two or more component liquids, said determination step includes a step of determining the mass and/or volume ratio of at least two of the component liquids.

13. A method according to claim 1, wherein the gas-liquid fluid mixture comprises natural gas and condensate.

14. An apparatus for investigating the properties of a gas-liquid fluid mixture, the apparatus comprising:
a conduit along which the mixture is conveyable, the conduit having a first constriction region providing a reduced conduit cross section; and
a measurement assembly for determining one or more properties of the liquid as it flows through the first constriction region;
wherein the conduit is adapted to induce the mixture to exhibit swirling flow in the first constriction region, thereby separating the liquid from the gas.

15. An apparatus according to claim 14, wherein the measurement assembly includes one or more pressure meters for measuring the difference in fluid pressure between a position in the first constriction region and a position in a region of the conduit upstream and/or downstream of the first constriction region.

16. An apparatus according to claim 14, further comprising:
a second constriction region providing a reduced conduit cross section, the conduit being adapted such that the mixture does not exhibit swirling flow in the second constriction region.

17. An apparatus according to claim 16, wherein the measurement assembly includes one or more pressure meters for measuring the difference in fluid pressure between a position in the second constriction region and a position in a region of the conduit upstream and/or downstream of the second constriction region.

18. An apparatus according to claim 14, wherein the conduit includes a swirl element for inducing the mixture to exhibit swirling flow in the first constriction region.

19. An apparatus according to claim 18, wherein the swirl element is provided upstream of the first constriction region.

20. An apparatus according to claim 14, wherein the measurement assembly is adapted to output a signal indicative of the liquid velocity in the first constriction region.

21. An apparatus according to claim 20, wherein the measurement assembly is adapted to measure the liquid velocity using an ultrasound Doppler technique.

22. An apparatus according to claim 14, wherein the measurement assembly is adapted to output a signal indicative of the liquid hold-up in the first constriction region.

23. An apparatus according to claim 22, wherein the measurement assembly is adapted to measure the liquid hold-up using an ultrasound technique to detect the gas-liquid interface.

24. An apparatus according to claim 14, wherein the measurement assembly is adapted to output a signal indicative of the liquid sound velocity in the first constriction region.

25. An apparatus according to claim 14, wherein the gas-liquid fluid mixture comprises natural gas and condensate.

26. An oil well pipeline or a gas well pipeline comprising an apparatus according to claim 14.

27. The use of swirling flow in a conduit conveying a gas-liquid fluid mixture to separate the mixture in a constriction region of a conduit, the constriction region providing a reduced conduit cross section.

28. The use of swirling flow in a conduit conveying a gas-liquid fluid mixture to increase the liquid hold-up in a constriction region of the conduit, the constriction region providing a reduced conduit cross section.

* * * * *